United States Patent Office 3,120,487
Patented Feb. 4, 1964

3,120,487
SOLVENT EXTRACTION WITH ALKYL SUB-
STITUTED 2-OXAZOLIDONES
Charles J. Norton, Denver, Colo., and Thurle E. Moss,
Findlay, Ohio, assignors to Marathon Oil Company,
Findlay, Ohio, a corporation of Ohio
No Drawing. Filed July 2, 1962, Ser. No. 207,064
17 Claims. (Cl. 208—326)

This invention relates to the separation of hydrocarbon mixtures into fractions of different structural types, and more particularly to processes for separating mixtures of hydrocarbons into groups characterized by similarity of carbon-to-hydrogen ratios, and the members of the groups being further characterized by substantially the same boiling ranges. In accordance with the instant invention, the hydrocarbon mixtures may be recovered fractions of natural hydrocarbon mixtures, such as obtained in the processing of petroleum hydrocarbons, tars and/or coal oil, shale oil and the like, and are treated by a selective solvent in a manner to provide a substantial segregation of the contained aromatics from the associated raffinate constituents by using an economical and highly selective solvent.

It is well known that most mineral oils, including petroleum, coal, shale and the like, and such fractions thereof as produced by distillation, cracking, hydrogenation and other treatments, contain various aromatic hydrocarbons mixed with paraffinic, olefinic, hetrocyclic, etc. hydrocarbons. Conventionally, many important fractions of the oils are recovered by a fractionation process, and each fraction includes within its specific boiling range various types of olefins, paraffins, aromatics, etc. Since individual members of the various types have overlapping boiling points, even very careful fractional distillation does not provide a satisfactory separation for the components.

It is known in the art to separate various components of such oils by an extraction process utilizing a solvent having preferential affinity or selectivity for one or more of the components. Many different types of so called selective solvents have been suggested and a few are commercially utilized for the solvent extraction of various components from such hydrocarbon mixtures. These solvents include, inter alia, phenol, furfural, creosote, nitrobenzene, sulfur dioxide, diethylene glycol, polyethylene glycol, dimethyl formamide, various lactams and lactones, etc. Another recently suggested selective solvent is liquid 2-oxazolidone and its nitrogen methyl derivatives. The selective solvents have been used with varying degrees of success, since no one solvent is satisfactory under all conditions and with all mixtures. The latter named compounds have selective solvent activity but have relatively low boiling points somewhat limiting their usefulness in separating mixtures having a boiling point range overlapping that of the solvents. Also, alkylation of the nitrogen group tends to decrease not only the selectivity of the solvent but also sensitivity to selectivity modification, as by means of hydrogen-bonding co-solvents such as water.

Normally, in selective solvent extraction for the separation of one component of a hydrocarbon mixture, one or more components of the mixture must be miscible with the selective solvent and the remainder must be less miscible so that two layers or phases form when the solvent is mixed with the mixture. Further, and one of the more important requirements for a commercially attractive selective solvent, is that it must have a substantial capacity for the component to be separated, so that the volumes of solution involved are not uneconomically large as to require extensive storage and fluid handling systems. Of the more commonly known selective solvents such as those mentioned above, few have found extensive use in commercial operations because they lack one or more of the desirable characteristics; for example, a solvent may have high selectivity but has low capacity for absorption of the desired component, and vice versa.

According to the present invention, we have discovered a solvent which is economical and combines excellent selectivity with high capacity for the recovery of aromatic hydrocarbons from hydrocarbon feed mixtures such as those discussed above. The selective solvent power of solvents according to the instant invention provides good solvent-to-oil ratios whereby low volumes of selective solvents are maintained; and yet a good recovery of aromatic hydrocarbons is obtained from the material treated.

Selective solvents according to the instant invention are liquid 2-oxazolidone compounds characterized by the formula

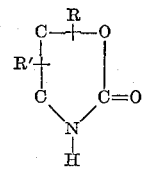

wherein R and R' are selected from the group consisting of hydrogen and a lower alkyl group, but at least one of which is a methyl group.

Accordingly, it is an object of this invention to provide a solvent which is highly selective for the aromatic hydrocarbons in a mixture with other classes of hydrocarbons, which has high capacity as well as high selectivity for the aromatics of a hydrocarbon mixture or fraction thereof, and which is easily separated from such fraction by a simple distillation or may be removed by water washing.

It is another object of this invention to provide a selective solvent particularly useful in selective solvent extraction processes for treating gasoline and gas-oil boiling range hydrocarbon mixtures.

Other objects and further features and advantages of selective solvents according to the instant invention will be obvious to those skilled in the art by specific reference to the following detailed description of the invention and experimental results.

A preferred selective solvent according to this invention is 5-methyl-2-oxazolidone. While, as noted above, nitrogen methyl derivatives of 2-oxazolidone have been suggested, it has now been discovered that alkyl substitution on a carbon group rather than the nitrogen atom, according to the instant invention, produces a higher boiling point compound, thereby permitting readier separation of the lower boiling aromatic hydrocarbon in the product extract by distillation, than either the parent compound 2-oxazolidone or its nitrogen-methyl derivatives. Also, while the molecular weight is increased in our carbon-alkylated series, the hydrogen bonding capacity of the nitrogen with hydroxylic co-solvents such as water is retained for high selectivity modification. Consequently, the nonsubstituted nitrogen compositions of the present invention have a substantial increase in selectivity and an increased sensitivity to selectivity modification by means of hydrogen-bonding co-solvents such as water, as compared with the nitrogen-alkylated series of 2-oxazolidones.

The preferred solvent, 5-methyl-2-oxazolidone, is a liquid at normal conditions of temperature and pressure, has a molecular weight of 101.104, a boiling point of 110° C. at 1 mm. of mercury, and 100° C. at 10 mm. of mercury. The solvent is highly selective for the aromatics in gasoline range refinery streams, as demonstrated by the examples below.

*Example 1*

In one test utilizing 5-methyl-2-oxazolidone as a selective solvent, 5.00 ml. of the solvent was shaken with a mixture of 5.00 ml. of toluene and 5.00 ml. of heptane in a centrifuge tube. Toluene has a refractive index of $n_D^{23}$ 1.4950, heptane $n_D^{23}$ 1.3852, and the solvent 5-methyl-2-oxazolidone, $n_D^{23}$ 1.4595.

On centrifuging, the above mixture separated into two liquid phases. The upper phase consisted of 8.5 ml. having a refractive index of $n_D^{23}$ 1.4358; the lower phase consisted of 6.5 ml. having a refractive index of $n_D^{23}$ 1.4661.

A small sample of both the upper and lower phases were separately removed and separately washed with distilled water to a constant refractive index.

The refractive indices of the solvent free separated samples were as follows: upper phase $n_D^{23}$ 1.4336 and the lower phase $n_D^{23}$ 1.4880. The lower phase was the extract or solvent-rich phase while the upper phase was the raffinate or solvent-lean phase.

Expressing the foregoing to indicate the percentage of solvent in the upper and lower phases and the selectivity and capacity of the tested solvent, the following is presented:

Volume extracted = 6.5 − 5.0 = 1.5 m.

Percent solvent in upper phase $$= 100 \frac{1.4358 - 1.4330}{1.4595 - 1.4330} = 10.6\%$$

Percent solvent in lower phase $$= 100 \frac{1.4880 - 1.4661}{1.4880 - 1.4595} = 76.8\%$$

Oil in upper phase = 0.894 × 8.5 = 7.6 ml.

Oil in lower phase = 0.232 × 6.5 = 1.5 ml.

Oil balance = 9.1 ml./10.0 = 91%

Percent toluene in extract = $100 \frac{1.4880 - 1.3852}{1.4950 - 1.3852} = 93.6\%$ Percent toluene in raffinate = $100 \frac{1.4330 - 1.3852}{1.4950 - 1.3852} = 43.5\%$ Selectivity = $\frac{93.6}{43.5} = 2.15$ Capacity = $\frac{1.5}{5.0} = 0.300$ Tests were conducted to show the higher selectivity of the selective solvents according to the instant invention as compared to 2-oxazolidone and its nitrogen substituted derivative. The selectivity is defined by the following:

$$\beta_{BC} = \frac{X_{CB} X_{AA}}{X_{CA} X_{AB}}$$

where $\beta_{BC}$ is the selectivity of B for C,
$X_{BC}$ is the mole fraction of C in the $\beta$-phase on a solvent-free basis, and
$X_{AA}$, $X_{CA}$, $X_{AB}$ are similarly defined.

The following results were obtained:

| Solvent (1) | Extraction Temp., °C. | β | Vol. Percent Extract Yield |
|---|---|---|---|
| 2-oxazolidone | 100 | 15.0 | 13.0 |
| N-methyl-2-oxazolidone | 25 | 10.4 | 24.5 |
| N-methyl-2-oxazolidone+10 vol. percent H₂O | 25 | 13.0 | 14.7 |
| N-(β-hydroxyethyl)-2-oxazolidone | 100 | 12.0 | 8.1 |
| 5-methyl-2-oxazolidone | 25 | 19.0 | 15.0 |

Especially to be noted in this comparison is the unexpected fact that the selectivity under the extraction conditions goes down markedly in the nitrogen-methyl homolog, but goes up in the 5-carbon substituted homolog (5-methyl-2-oxazolidone). Furthermore, the 5-carbon-methyl homolog has a higher capacity than the parent homolog, which together with its higher melting and higher boiling points make it uniquely the superior solvent for extraction applications.

Tests were then undertaken to compare solvents according to the instant invention with other previously known and utilized selective solvents. For this comparison, the selectivity is redefined by the formula $$\text{Selectivity} = \frac{X_{CB}}{X_{CA}}$$

where $X_{CB}$ has the same definition as above, and $X_{CA}$ is similar for C in the A phase. The results of these tests are set forth in the following table:

| Solvent | Capacity | Selectivity |
|---|---|---|
| 5-methyl-2-oxazolidone | 0.300 | 2.15 |
| 2-dioxolone | 0.168 | 2.04 |
| Ethylene carbonate | 0.176 | 2.00 |
| Tetramethylenesulfone | 0.338 | 2.15 |
| Dimethylsulfoxide | 0.408 | 2.07 |
| β-Propiolactone | 0.514 | 2.09 |
| Citraconic anhydride | 0.608 | 2.03 |
| γ-Butyrolactone | 0.770 | 1.99 |

The conditions and results of Examples 2 through 5 are summarized in the following table. These experiments were all carried out at an oil-to-solvent ratio of 2:1.

EXTRACTION OF AROMATIC HYDROCARBONS FROM VARIOUS REFINERY PRODUCT STREAMS WITH 5-METHYL-2-OXAZOLIDONE SOLVENT AT 2:1 OIL-TO-SOLVENT RATIO

| Example No. | Solvent | | Hydrocarbon Mixture | | | Raffinate | | | Extract | | | | Vol. percent Aromatic Yield Based on Feed |
|---|---|---|---|---|---|---|---|---|---|---|---|---|---|
| | Vol., ml. | $n_D^{20}$ | Refinery Stream | Vol., ml. | $n_D^{20}$ | Vol., ml. | $n_D^{20}$ before Washing | $n_D^{20}$ after Washing | Vol., ml. | $n_D^{20}$ before Washing | $n_D^{20}$ after Washing | Vol. percent Aromatic hydrocarbons in Extract Phase | |
| 2 | 5.00 | 1.4602 | Reformate | 10.00 | 1.4458 | 9.1 | 1.4442 | 1.4450 | 5.9 | 1.4657 | 1.4932 | 16.6 | 9.8 |
| 3 | 5.00 | 1.4602 | Heavy Catalytically Cracked Gasoline. | 10.00 | 1.4770 | 9.3 | 1.4737 | 1.4738 | 5.7 | 1.4680 | 1.5207 | 12.9 | 7.4 |
| 4 | 5.00 | 1.4602 | Light Catalytic Cycle Oil. | 10.00 | 1.5183 | 9.3 | 1.5100 | 1.5102 | 5.7 | 1.4807 | 1.6160 | 13.2 | 7.6 |
| 5 | 5.00 | 1.4602 | Heavy Catalytic Cycle Oil. | 10.00 | 1.5208 | 9.3 | 1.5101 | 1.5102 | 5.7 | 1.4852 | 1.6536 | 12.9 | 7.4 |

*Example 2*

In a calibrated centrifuge tube were placed 5.00 ml. of 5-methyl-2-oxazolidone ($n_D^{23}$ 1.4602) and 10.00 ml. of reformate refinery product stream ($n_D^{23}$ 1.4458) of about 150–425° F. boiling range. The test tube was stoppered with a clean rubber stopper and vigorously shaken for about one minute. The two product phases were allowed to separate, and the separation was completed by centrifugation, yielding 5.9 ml. of a lower extract phase, $n_D^{20}$ 1.4657, and 9.1 ml. of an upper raffinate phase, $n_D^{20}$ 1.4442.

Samples of the phases were removed and washed with excess water to remove the solvent. The washed raffinate gave $n_D^{20}$ 1.4450, and the washed extract gave $n_D^{20}$ 1.4932. The product raffinate phase contained less than 5 volume percent dissolved solvent. The extract phase consisted of 16.6% aromatic hydrocarbons and represented a 9.8 volume percent aromatic yield based on the reformate feed volume.

*Example 3*

In a calibrated centrifuge test tube were placed 5.00 ml. of 5-methyl-2-oxazolidone ($n_D^{20}$ 1.4602) and 10.00 ml. of a heavy catalytically cracked gasoline refinery product stream ($n_D^{20}$ 1.4770) of about 300–450° F. boiling range. The test tube was stoppered with a clean rubber stopper and vigorously shaken for about one minute. The two product phases were allowed to separate, and the separation was completely by centrifugation, yielding 5.7 ml. of a lower extract phase, $n_D^{20}$ 1.4680, and 9.3 ml. of an upper raffinate phase, $n_D^{20}$ 4.4737.

Samples of the phases were removed and washed with excess water to remove the solvent. The washed raffinate gave $n_D^{20}$ 1.4738, and the washed extract gave $n_D^{20}$ 1.5207. The product raffinate phase contained less than 1 volume percent solvent. The extract phase consisted of 12.9 volume percent aromatic hydrocarbons and represented a 7.4 volume percent aromatic yield based on the heavy catalytically cracked gasoline volume.

*Example 4*

In a calibrated centrifuge test tube were placed 5.00 ml. of 5-methyl-2-oxazolidone ($n_D^{20}$ 1.4602) and 10.00 ml. of light catalytic cycle oil refinery product stream ($n_D^{20}$ 1.5183) of about 395–635° F. boiling range. The test tube was stoppered with a clean rubber stopper and vigorously shaken for about one minute. The two product phases were allowed to separate, and the separation was completed by centrifugation, yielding 5.7 ml. of a lower extract phase, $n_D^{20}$ 1.4807, and 9.3 ml. of an upper raffinate phase, $n_D^{20}$ 1.5100.

*Example 5*

In a calibrated centrifuge test tube were placed 5.00 ml. of 5-methyl-2-oxazolidone ($n_D^{20}$ 1.4602) and 10.00 ml. of heavy catalytic cycle oil refinery product stream ($n_D^{20}$ 1.5208) of about 500–750° F. boiling range. The test tube was stoppered with a clean rubber stopper and vigorously shaken for about one minute. The two product phases were allowed to separate and the separation was completed by centrifugation, yielding 5.7 ml. of a lower extract phase, $n_D^{20}$ 1.4852, and 9.3 ml. of an upper raffinate phase, $n_D^{20}$ 1.5101.

Samples of the phases were removed and washed with excess water to remove the solvent. The washed raffinate gave $n_D^{20}$ 1.5102, and the washed extract gave $n_D^{20}$ 1.6536. The product raffinate phase contained less than 1 volume percent dissolved solvent. The extract phase consisted of 12.9 volume percent aromatic hydrocarbons and represented a 7.4 volume percent aromatic yield based on the heavy catalytic cycle oil feed volume.

These comparative tests indicated remarkable selectivity of the 5-methyl-2-oxazolidone selective solvent as well as excellent capacity. Other substituted 2-oxazolidones may be used in a similar manner to extract aromatic hydrocarbons from mixtures containing the same and among the useful 2-oxazolidones are included 4-methyl-2-oxazolidone, 4-ethyl-2-oxazolidone, 5-ethyl-2-oxazolidone, 4,5-dimethyl-2-oxazolidone, 5-isopropyl-2-oxazolidone, 5-n-propyl-2-oxazolidone, 4-isopropyl-2-oxazolidone, 4-n-propyl-2-oxazolidone, 4,4-dimethyl-5-methyl-2-oxazolidone, 5,5-dimethyl-4-methyl-2-oxazolidone, etc. These solvents may be used alone or with hydroxylic co-solvents, such as water, to increase their sensitivity.

While the invention has been described in relation to particular examples and a preferred example of the series herein disclosed, there is no intent to limit the spirit or the scope of the invention to the precise details so set forth except insofar as defined in the following claims.

I claim:

1. A process of separating a mixture of hydrocarbons into groups characterized by similarity of carbon-to-hydrogen ratios of the members of said groups, which comprises selectively extracting said mixture with a liquid 2-oxazolidone compound characterized by the formula

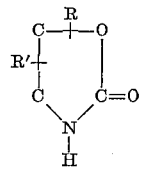

wherein R and R' are selected from the group consisting of hydrogen and a lower alkyl group, and at least one of which is a methyl group.

2. The process of claim 1 in which the liquid 2-oxazolidone is 5-methyl-2-oxazolidone.

3. A process of separating a mixture of hydrocarbons into groups of substantially the same boiling range and characterized by similarity of the carbon-to-hydrogen ratios of the members of said groups, which comprises selectively extracting said mixture with a liquid 2-oxazolidone compound characterized by the formula

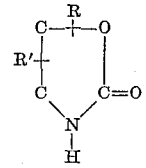

wherein R and R' are different and are selected from the group consisting of hydrogen and methyl, separating the resulting phases, removing the selected liquid 2-oxazolidone from the resulting separated phases, and recovering the separated selected liquid 2-oxazolidone free groups.

4. A process according to claim 3 in which the selected liquid 2-oxazolidone is removed from the resulting separated phases by water washing.

5. In a separation of aromatic hydrocarbons from a mixture of the same with non-aromatic hydrocarbon materials by solvent extraction, the step of treating a liquid mixture containing aromatic hydrocarbons with a selective solvent characterized by the formula

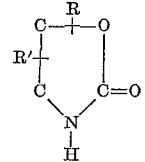

wherein R and R' are selected from the group consisting of hydrogen and a lower alkyl group, and at least one of which is a methyl group.

6. In a separation of aromatic hydrocarbons from a mixture of the same with non-aromatic hydrocarbon materials by solvent extraction, the step of treating a liquid mixture containing aromatic hydrocarbons with a selective solvent consisting of 5-methyl-2-oxazolidone.

7. In the process of claim 5 wherein the solvent is 4-methyl-2-oxazolidone.

8. In the process of claim 5 wherein the solvent is 4,5-dimethyl-2-oxazolidone.

9. In the process of claim 5 wherein the solvent is 5-ethyl-2-oxazolidone.

10. In the process of claim 5 wherein the solvent is 5-propyl-2-oxazolidone.

11. In a separation of aromatic hydrocarbons from a mixture of the same with non-aromatic hydrocarbon materials by solvent extraction, the step of treating a liquid mixture containing aromatic hydrocarbons with a selective solvent consisting of an intimate mixture of a major portion of 5-methyl-2-oxazolidone and a minor quantity of water for selectivity modification.

12. A process according to claim 1 wherein the hydrocarbon mixture is a refinery stream.

13. A process according to claim 1 wherein the hydrocarbon mixture is a reformate refinery stream.

14. A process according to claim 1 wherein the hydrocarbon mixture is a heavy catalytically cracked refinery stream.

15. A process according to claim 1 wherein the hydrocarbon mixture is a light catalytic cycle oil stream.

16. A process according to claim 1 wherein the hydrocarbon mixture is a heavy catalytic cycle oil stream.

17. A process according to claim 11 wherein the hydrocarbon mixture is a refinery stream.

No references cited.